United States Patent [19]

Morrow et al.

[11] Patent Number: 4,964,546

[45] Date of Patent: Oct. 23, 1990

[54] MEASURED QUANTITY DISPENSER

[75] Inventors: Lester Morrow, Ossining; R. Christopher Kidd, New York, both of N.Y.

[73] Assignee: Marlboro Marketing, Inc., New York, N.Y.

[21] Appl. No.: 425,348

[22] Filed: Sep. 15, 1989

Related U.S. Application Data

[63] Continuation of Ser. No. 218,314, Jul. 12, 1988, abandoned.

[51] Int. Cl.⁵ .............................................. G01F 11/10
[52] U.S. Cl. ...................................... 222/352; 222/361
[58] Field of Search .............. 222/352, 345, 361, 362, 222/346, 347, 349

[56] References Cited

U.S. PATENT DOCUMENTS

| | | | |
|---|---|---|---|
| 16,198 | 12/1856 | Wyant | 222/352 |
| 68,760 | 9/1867 | Lipe | 222/352 X |
| 84,571 | 12/1868 | Nevison | 222/352 X |
| 107,156 | 9/1870 | Bond | 222/352 |
| 414,320 | 11/1889 | Kling | 222/352 X |
| 737,678 | 9/1903 | Tyson | 222/352 X |
| 926,171 | 6/1909 | Cargill | 222/352 X |
| 995,812 | 6/1911 | Stevens | 222/352 X |
| 1,038,178 | 9/1912 | Mills | 222/352 X |
| 1,077,999 | 11/1913 | Rees | 222/352 X |
| 1,970,686 | 8/1934 | Bolen | 222/349 X |
| 2,596,568 | 5/1952 | Lehman | 222/352 |
| 2,680,540 | 6/1954 | Probasco | 222/349 |
| 2,983,408 | 5/1961 | Schwartz | 222/361 |
| 3,179,304 | 4/1965 | Heilbrunn | 222/352 |
| 3,217,945 | 11/1965 | Monaco | 222/361 |
| 4,440,322 | 4/1984 | Henry | 222/361 |

FOREIGN PATENT DOCUMENTS

| | | | |
|---|---|---|---|
| 341359 | 10/1919 | Fed. Rep. of Germany | 222/352 |
| 7457 | of 1911 | United Kingdom | 222/352 |

Primary Examiner—Kevin P. Shaver
Attorney, Agent, or Firm—Darby & Darby

[57] ABSTRACT

Measured quantity dispenser for frangible granules, which includes a housing having a lower slide surface with a front discharge opening, and a rear loading aperture above the slide surface for intake of such granules from a hopper. A receptacle movable in the housing between a rearward loading position and a forward discharge position, and contains a forward measuring bin of preselected volume and a rearward upper platform, the bin having an upper entrance registering with the aperture when the receptacle is in rearward position, and a lower exit registering with the opening when the receptacle is in forward position. A resilient leveling mechanism is arranged at the aperture front edge cooperating with the entrance and platform to prevent overlying granules in the aperture from moving forwardly between the mechanism and platform and being sheared or jammed between the aperture front edge and entrance rear edge, during receptacle forward movement with the granules at the exit sliding on the slide surface, and with the platform sliding against overlying granules in the aperture, for discharge of bin loaded granules through the opening when the receptacle reaches the forward position.

12 Claims, 2 Drawing Sheets

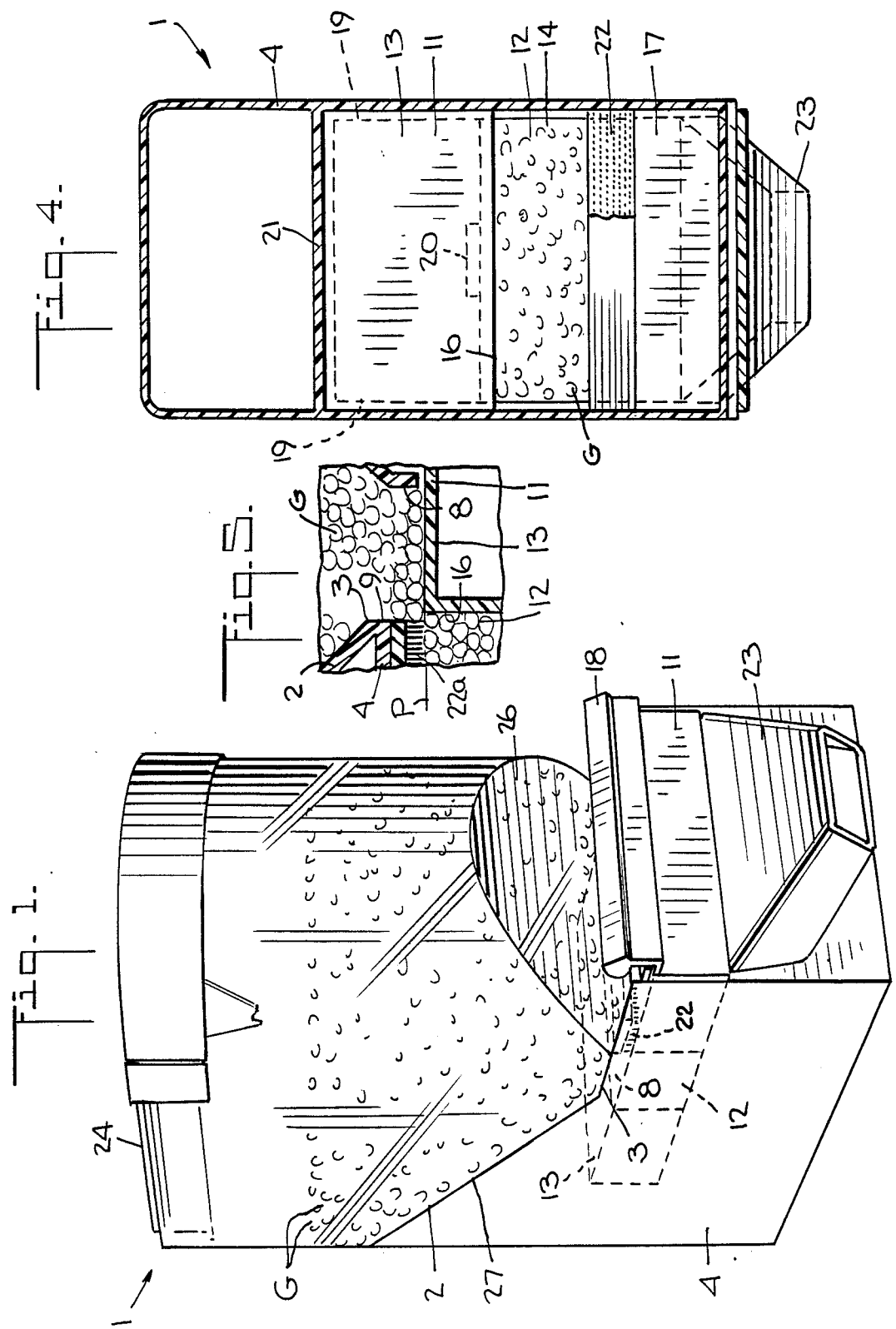

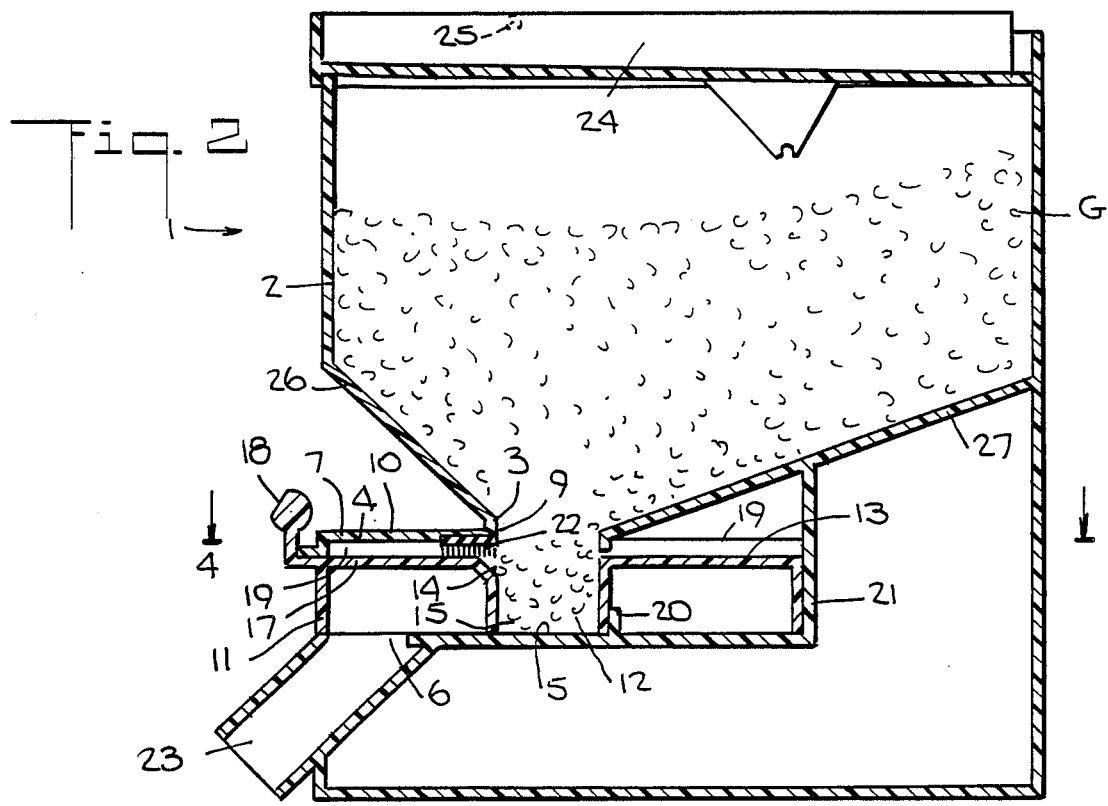
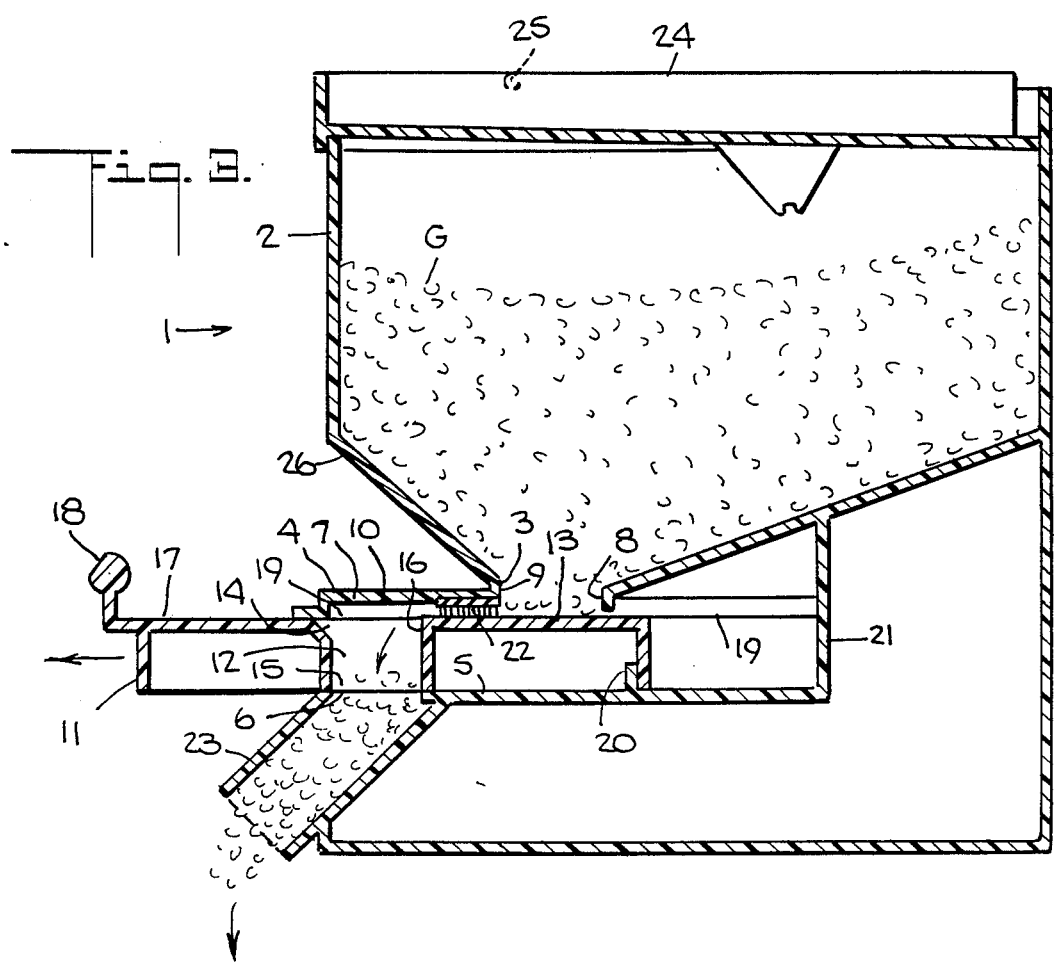

MEASURED QUANTITY DISPENSER

This is a continuation of application Ser. No. 218,314, filed July 12, 1988 and now abandon.

FIELD AND BACKGROUND OF THE INVENTION

The present invention relates to a measured quantity dispenser, and more particularly to such a dispenser for dispensing flowable solids material, such as coffee beans or other frangible granules, in predetermined measured quantities or batches, and having dispensing parts slidable relative to one another and cooperating means to prevent individual solids material granules from being sheared or jammed between such parts during the dispensing operation.

Dispensers are known for dispensing flowable solids material such as frangible granules, and in particular coffee beans, which utilize a slidable drawer or receptacle in a housing provided with an overlying storage hopper. In the usual case, when the receptacle is at an inward loading position, its preselected volume is filled with a like volume measured quantity of the granules by gravity flow from the hopper, and when the receptacle is moved to an outward discharge position, the granules being dispensed are discharged therefrom.

A major problem with such known type dispensers is that, as the receptacle is moved from the inward loading position to the outward discharge position, the granules located at the intermediate zone between the top portion of the movable receptacle and the bottom portion of the overlying hopper outlet tend to become jammed between the adjacent internal surfaces and edges of the arrangement, and often are sheared or fractured between internal stationary edge portions of the dispenser housing and corresponding moving edge portions of the receptacle.

This problem is especially troublesome in the case of frangible edible granules such as coffee beans, since once sheared or fractured the natural protection offered by the intact granule is lost, and the internal contents of the granule are exposed to the adverse conditions of the environment. One detrimental result, especially critical in the case of coffee beans, is the loss of essential oils from the granules by volatilization into the atmosphere, which quantitatively diminishes the available flavor imparting ingredients therein, and another is the exposure of the remaining contents to the constituents in air, which causes oxidation of various substances present, ultimately resulting in a rancid product.

These dispensers are typically used in merchandise establishments, such as retail food stores, and no matter how delicate the manipulation of the receptacle, it is generally not possible to operate them without such jamming and shearing problem arising, especially where the attendant is in a hurry and cannot devote undue time and attention to carrying out the dispensing operation in a manner sufficiently delicate under the pressing circumstances to avoid such problem.

Moreover, where the attendant is unfamiliar with the problem, extra time must be devoted to learning how to operate the dispenser so as to minimize the stated adverse results. The situation is even worse where the dispenser is available for self-service customer use, and in this case may even lead to serious jamming thereof, requiring its repair.

Quite aside from damage to the coffee beans or other granules themselves in the dispensed product as sold, and the ensuing detriment from that source, it will be appreciated that fragments of broken granules may also lodge and collect locally in the dispenser at various dead spaces therein and eventually become stale or rancid. At a later time, due to vibrations generated during normal operation of the dispenser or its physical movement from one place to another, such stale or rancid fragments may become dislodged and find their way into the next dispensed batch of product, adulterating the same, and possibly leading to illness of the consumer partaking of the product, if not to ill will towards the retailer.

It would be desirable to provide a measured quantity dispenser of the forgoing type, permitting efficient operation without fear of shearing or jamming of the frangible granules in the system, and thus avoiding the above problem and its ensuing ramifications.

SUMMARY OF THE INVENTION

It is among the objects of this invention to provide a measured quantity dispenser for dispensing flowable solids material, such as coffee beans or other frangible granules, in predetermined measured quantities or batches, and having dispensing parts slidable relative to one another and cooperating means to prevent individual solids material granules from being sheared or jammed between such parts during the dispensing operation.

It is among the additional objects of this invention to provide a dispenser of the stated type, composed of a minimum of parts, of serviceable and comparatively inexpensive construction, and readily produced from commercially available materials.

According to this invention, a measured quantity dispenser for flowable solids material such as frangible granules, for example coffee beans or the like, is advantageously provided, which comprises a housing and a dispensing receptacle movable relative to the housing, in combination with resilient leveling means to prevent individual solids material granules from being sheared or jammed between such parts during the dispensing operation.

The housing has a lower slide surface containing a front discharge opening, and an upper portion containing a rear loading aperture above the slide surface and rearwardly of the opening and provided with a front edge, the aperture being adapted for intake of solids material from an overlying source.

The receptacle is disposed in the housing for movement between a rearward loading position and a forward discharge position, and contains a forward measuring bin and a rearward upper slide platform, the bin having an upper entrance at a level adjacent the aperture and a lower exit at a level adjacent the slide surface, and the bin being of selective volume for receiving and dispensing a predetermined measured quantity of solids material.

The entrance is provided with a rear edge and the platform extends rearwardly from the rear edge, such that the entrance is in operative registry with the aperture when the receptacle is in rearward position for loading solids material into the bin from the source, and the exit is in operative registry with the opening when the receptacle is in forward position for discharging the solids material from the bin.

Significantly, the resilient leveling means is disposed in the housing adjacent the aperture front edge and arranged for cooperation with the entrance and platform to prevent overlying solids material in the aperture from moving forwardly in the housing between the leveling means and platform and from being sheared or jammed between the aperture front edge and entrance rear edge, during receptacle forward movement with the solids material at the exit sliding on the slide surface, and with the platform sliding against overlying solids material in the aperture, for discharge of the bin loaded solids material from the exit through the opening when the receptacle reaches the forward position.

Typically, a storage hopper is disposed in overlying relation to the housing, and has an outlet flow communicating with the aperture for feeding solids material to the bin.

Conveniently, a conveying chute may be arranged at the opening for guiding the flow of solids material being discharged thereat, and a handle may be arranged on the receptacle for permitting manual movement of the receptacle between its rearward and forward positions. Also, guide means may be provided in the housing for slidably guiding the receptacle relative to the housing during movement of the receptacle between said positions.

In particular, the upper portion of the housing includes an upper wall extending forwardly from the aperture front edge and overlying the slide surface, and the leveling means are disposed on the upper wall. The leveling means are desirably provided in the form of a plurality of side by side resilient finger-like elements disposed along the aperture front edge in downwardly extending facing relation to the slide surface, and may specifically comprise a brush assembly.

BRIEF DESCRIPTION OF THE DRAWINGS

Other objects of the invention will become apparent from the within specification and accompanying drawings, in which:

FIG. 1 is a perspective view of the dispenser according to an embodiment of the invention;

FIGS. 2 and 3 are sectional views of the dispenser of FIG. 1, respectively showing the dispensing receptacle in rearward loading position and in forward discharge position;

FIG. 4 is a sectional view taken along the line 4—4 of FIG. 2; and

FIG. 5 is a schematic exaggerated partial sectional view similar to FIGS. 2 and 3, and showing the receptacle during forward movement from the position shown in FIG. 2 to that shown in FIG. 3.

DESCRIPTION OF THE PREFERRED EMBODIMENTS

Referring to the drawings, and initially to FIGS. 1-2, a measured quantity solids dispenser 1 is shown, including an upright storage hopper 2 having a generally horizontal, transversely disposed, lower feed outlet 3 arranged in overlying relation to a slide housing 4.

Housing 4 has a generally horizontal and flat lower slide surface 5 containing a generally horizontal, transversely disposed, front discharge opening 6, and an upper portion 7 containing a generally horizontal, transversely disposed, rear loading aperture 8 above slide surface 5 and rearwardly of opening 6. Aperture 8 is provided with a generally horizontal, transversely disposed, front edge 9 and is arranged for intake of flowable solids material such as frangible granules G, e.g. coffee beans or the like, from hopper 2 via outlet 3, in particular under gravity flow action. Upper portion 7 further includes a generally horizontal and flat upper wall 10 extending forwardly from aperture front edge 9 to the front of housing 4 and overlying slide surface 5.

A generally horizontal drawer or slide receptacle 11 is disposed in housing 4 for movement between a rearward or inward loading position (FIG. 2) and a forward or outward discharge position (FIG. 3), and contains a generally horizontal, transversely disposed, forward measuring bin 12 and a generally horizontal and flat rearward upper or raised slide platform 13 (FIG. 4).

Bin 12 is provided with a generally horizontal, transversely disposed, upper open entrance 14 at a vertical level adjacent aperture 8 and upper wall 10, and a generally horizontal, transversely disposed, lower open exit 15 at a level adjacent slide surface 5, and is of selective volume for receiving and dispensing a predetermined measured quantity of granules G, such as 1 pound of coffee beans at a time. Entrance 14 is provided with a generally horizontal, transversely disposed, rear edge 16 and platform 13 extends rearwardly therefrom.

Entrance 14 is in operative registry with aperture 8 thereabove when receptacle 11 is in rearward position for loading granules G into bin 12 from hopper 2 (FIG. 2), whereas exit 15 is in operative registry with opening 6 therebelow when receptacle 11 is in forward position for discharging granules G from bin 12 (FIG. 3). Thus, outlet 3, opening 6, aperture 8, bin 12, entrance 14, and exit 15, are conveniently of more or less the same size and shape as seen from above (cf. FIGS. 1 and 4), for unhindered gravity flow of granules G from hopper 2 to bin 12 when receptacle 11 is in rearward position, and from bin 12 to opening 6 for dispensing when receptacle 11 is in forward position.

The forward portion 17 of receptacle 11 is conveniently provided with an exposed handle 18 to permit manual movement of receptacle 11 between its rearward and forward positions. To facilitate such movement, housing 4 may be provided with guide means for slidably guiding receptacle 11 relative to housing 4, such as the side wall guide tracks 19,19, e.g. in close overlying disposition to receptacle forward portion 17 and rearward platform 13 for sliding contact therewith, and/or such as slide surface 5 itself on which the underside portions of receptacle 11 may slide.

A suitably positioned stop 20, or the like, may be provided in housing 4 to limit outward movement of receptacle 11 relative to housing 4 (FIG. 3), and optionally also to limit inward movement of receptacle 11 (FIG. 2), although the latter may be achieved instead by sizing and positioning housing rear vertical wall 21 relative to receptacle 11 such that the rearmost portion of platform 13 is stopped by wall 21 when receptacle 11 reaches its rearward position.

A primary feature of the construction of this invention is the provision for resilient leveling means 22 in housing 4 adjacent aperture front edge 9 and arranged e.g. in immediate underlying relation to front edge 9 and in immediate overlying relation to entrance 14 and platform 13, for cooperation with entrance 14 and platform 13. Leveling means 22 may be suitably provided in the form of side by side resilient finger-like elements 22a (FIG. 5), disposed along aperture front edge 9 in downwardly extending facing relation to slide surface 5, and may be preferably constituted as a brush assembly (FIG. 4).

Leveling means or brush assembly 22 is specifically arranged suitably on the underside of upper wall 10 to prevent overlying granules G in aperture 8 from moving forwardly in housing 4 between brush assembly 22 and platform 13 and from being sheared or jammed between the opposing rearwardly facing aperture front edge 9 and forwardly facing entrance rear edge 16, during movement of receptacle 11 forwardly with the granules G at exit 15 sliding on slide surface 5, and with platform 13 sliding against overlying granules G in aperture 8, for discharge of the granules G loaded in bin 12 from exit 15 through opening 6 when receptacle 11 reaches forward position.

FIG. 5 taken with FIGS. 1 and 2 make clear that entrance 14 is out of flow communication with aperture 8 when exit 15 is in flow communication with opening 6, and that exit 15 is out of flow communication with opening 6 when entrance 14 is in flow communication with aperture 8, such that during movement of receptacle 11, aperture 8 is out of flow communication with opening 6 through entrance 14 and exit 15 of bin 12 in receptacle 11. At the movement position of receptacle 11 shown in FIG. 5, the granules G remain at undisturbed full level in bin 12, i.e. just as entrance 14 is closed off from flow communication with aperture 8, and thus necessarily before exit 15 reaches opening 6 to start the emptying of the granules G from bin 12 via flow communication between exit 15 and opening 6.

A conveying chute 23 or the like may be conveniently arranged at opening 6 to guide the flow of granules G being discharged, e.g. for loading into a bag whose mouth may be fitted around chute 23 in the usual way to effect such end.

Hopper 2 may have the usual cover 24 pivoted via hinge system 25 to close a filling opening in the top thereof, and may be suitably provided with inclined side walls 26 and 27 to assure free gravity flow feeding of granules G stored therein to bin 12 when receptacle 11 is in rearward loading position. Walls 26 and 27 are desirably inclined at an angle exceeding the angle of repose of the solids material G, such as coffee bean granules, to facilitate free gravity flow of granules G from hopper 2 to bin 12. Otherwise, occasional tipping of hopper 2 may be necessary to assure flow of granules G lying on such walls 26 and/or 27.

However, as is clear from FIGS. 2, 3 and 5, it is just this convenience of free gravity flow in hopper 2 which imposes on the pile of granules G in bin 12 a downward force which normally immobilizes those granules G in the intervening zone between the top of entrance 14 and the closely adjacent bottom of aperture 8, and leads to shearing and jamming of those granules G between the opposing transverse aperture edge 9 and transverse entrance rear edge 16, which act as a pair of shears (cf. FIG. 4), and/or between the overlying horizontal upper wall 10 and those granules G lying just above the top of entrance 14, and/or between such wall 10 and those granules G which rest on the top of platform 13, as receptacle 11 moves to forward position.

Advantageously, by providing brush assembly 22 adjacent aperture front edge 9 for cooperation with entrance 14 and platform 13 during such forward movement of receptacle 11, the individual resilient finger-like elements 22a define a leveling system, relative to horizontal plane P (FIG. 5), which acts as a barrier to such forward movement of those granules G lying above the top of entrance 14, its rear edge 16, and platform 13, as defined by horizontal plane P thereat. Instead, as receptacle 11 moves forwardly, the resilient elements 22a become incrementally loaded or cocked in forward direction by those overlying granules G, and once loaded or cocked move rearwardly by snap action, thereby disturbing and dislodging those granules G.

As a consequence, the disturbed and dislodged granules G are forced rearwardly relative to the still forwardly moving receptacle 11, sliding over the top layer of granules G in bin 12 which are just flush with entrance 14 at plane P, and allowing bin 12 to move forwardly in unhindered manner, without any overlying granules G being sheared or jammed between edges 9 and 16, and/or between wall 10 and the top layer of granules G in bin 12, and/or between wall 10 and platform 13. Instead, as shown in FIGS. 3 and 5, the overlying granules G above plane P ride along platform 13 as the latter moves forwardly during the dispensing and discharging operation.

Understandably, the resiliency of the brush assembly 22, and of its individual finger-like elements 22a, must be selected to be sufficient to provide a resisting force capable of preventing those overlying granules G from moving forwardly on the top of the pile of granules G in bin 12 as receptacle 11 moves to forward position. This force must be sufficient to overcome the force represented by the weight of the column of granules G in hopper 2 overlying aperture 8, plus the force represented by the composite frictional resistance of the immediately overlying layer of granules G in contact at plane P with the top layer of granules G in bin 12 at entrance 14.

Furthermore, given the continuous forward movement of receptacle 11, it will be seen that once the loaded or cocked resilient elements 22a begin to spring back, they will vibrate or oscillate dynamically, analogous to the action of bristles on a scrubbing brush, more or less keeping those overlying granules in a state of momentary agitation and thus in comparatively loose condition, enabling the further continuous movement of receptacle 11 to be effected with diminished resistance from such overlying granules G.

On the other hand, return movement of receptacle 11 to rearward position may be effected without difficulty, since platform 13 is at a vertical level closely adjacent aperture 8, and the overlying granules G resting thereon at aperture 8, when receptacle 11 is in forward position, merely slide in place thereon as platform 13 moves rearwardly out of the range of aperture 8, whereupon such granules G again fill bin 12 when receptacle 11 reaches its rearward position.

The vertical gap or clearance between aperture 8 and platform 13 is understandably smaller than the size of granules G, so that the latter cannot move between platform 13 and aperture 8 and be sheared or jammed thereat, as receptacle 11 returns to rearward position. Besides, only platform 13 moves, whereas the overlying granules G remain stationary in aperture 8, and since platform 13 has a smooth planar sliding surface, relatively free of friction, there is no tendency for such granules to adhere thereto.

By contrast, those overlying granules G in aperture 8 which are in the intermediate layer in resting contact with the top layer of granules G in bin 12 at entrance 14, tend to engage and interlock with one another, since these opposing layers of granules G by their very nature do not present smooth planar sliding surfaces, but rather relatively rough composite surfaces.

Moreover, unlike the situation where platform 13 moves and such overlying layer of granules G remains stationary in aperture 8, merely sliding on platform 13 as it returns to rearward position, in the case of the forward movement of the granule loaded bin 12 the overlying layer of granules G tends to move with the top layer of granules G at entrance 14 rather than remain in place relative to aperture 8, thereby causing the problem of shearing and jamming. This latter problem is effectively overcome by the provision for brush assembly 22 according to this invention.

Advantageously, the overall result of the provision for brush assembly 22 is that dispenser 1 may be easily operated with immediate success, even by one unfamiliar with the underlying shearing and jamming problem encountered with the known type dispenser or with the delicate manipulations previously required to minimize the attendant adverse effects thereof, as pointed out above.

The dispenser according to this invention may be readily manufactured by conventional technique, e.g. by injection molding of plastic material to fabricate the hopper and housing, and their related parts, whereas the brush assembly may be made of shape retaining rubber or resilient plastic material, of suitable strength for providing the stated force for overcoming both the resistance offered by the weight of the granules or other solids material in the hopper overlying the housing aperture and the frictional resistance between those granules in the overlying layer immediately above the receptacle and the granules at the top of the bin adjacent the bin entrance.

Although reference has been made herein to the horizontal and vertical orientation, flat surface shape and transverse disposition, of various parts of the dispenser according to this invention, it will be understood that such parts may deviate from true horizontal and vertical orientation, flat surface shape and transverse disposition, as the case may be, so long as desired flow of the granules or other solids material into, through and from the various parts of the dispenser, and desired movement of such parts relative to one another, as the case may be, are achieved as intended.

Similarly, the hopper, housing and receptacle, and in particular the hopper outlet, housing opening, housing aperture and aperture front edge, bin, entrance and entrance rear edge, and exit, as they relate to each other, may be of any desired profile or cross sectional shape, consonant with the foregoing desired granule flow and relative movement of the parts.

It will be appreciated that the foregoing specification and accompanying drawings are set forth by way of illustration and not limitation of the present invention, and that various modifications and changes may be made therein without departing from the spirit and scope of the present invention which is to be limited solely by the scope of the appended claims.

What is claimed is:

1. Measured quantity dispenser for flowable solids material such as frangible granules, which comprises a housing having a lower slide surface containing a front discharge opening, and an upper portion containing a rear loading aperture above the slide surface and rearwardly of the opening and provided with a front edge, the aperture being adapted for intake of solids material from an overlying source, said upper portion of the housing having an upper wall with an underside extending forwardly from the aperture front edge and overlying the slide surface, a receptacle disposed in the housing for movement between a rearward loading position and a forward discharge position, and containing a forward measuring bin and a rearward upper slide platform, the bin having an upper open entrance at a level adjacent the aperture and a lower open exit at a level adjacent the slide surface, the bin being of selective volume for receiving and dispensing a predetermined measured quantity of solids material, the entrance of the bin being provided with a rear edge and the platform extending rearwardly from the rear edge, the entrance of the bin being further provided with an entrance front edge portion and a receptacle forward platform portion extending forwardly from said entrance front edge portion and located at a level below said aperture front edge portion, said receptacle forward platform portion and said underside of the upper wall of the housing forming a space therebetween, the entrance being in operative registry with the aperture when the receptacle is in rearward position for loading solids material into the bin from the source, and the exit being in operative registry with the opening when the receptacle is in forward position for discharging the solids material from the bin, and resilient leveling means disposed in the space formed by the receptacle forward platform portion and the entrance front edge portion with the underside of the upper wall of the housing adjacent the aperture front edge and arranged in immediate underlying relation to the aperture front edge and in immediate overlying relation to the entrance and platform for cooperation with the entrance and platform to prevent overlying solids material in the aperture from moving forwardly in the housing between the leveling means and platform and from being sheared or jammed between the aperture front edge and entrance rear edge, during receptacle forward movement with the solids material at the exit sliding on the slide surface, and with the platform sliding against overlying solids material in the aperture, for discharge of the bin loaded solids material from the exit through the opening when the receptacle reaches the forward position.

2. Dispenser of claim 1 wherein a storage hopper is disposed in overlying relation to the housing, and having an outlet flow communicating with the aperture for feeding solids material from the hopper via the aperture to the bin.

3. Dispenser of claim 1 wherein a conveying chute is arranged at the opening for guiding the flow of solids material being discharged thereat.

4. Dispenser of claim 1 wherein a handle is arranged on the receptacle for permitting manual movement of the receptacle between said positions.

5. Dispenser of claim 1 wherein guide means are provided in the housing for slidably guiding the receptacle relative to the housing during movement of the receptacle between said positions.

6. Dispenser of claim 1 wherein the leveling means include a plurality of side by side resilient finger-like elements disposed along the aperture front edge in downwardly extending facing relation to the slide surface.

7. Dispenser of claim 6 wherein the elements comprise a brush assembly.

8. Measured quantity dispenser for flowable solids material such as frangible granules, which comprises a gravity flow storage hopper having a lower feed outlet, a housing below the hopper and having a lower slide surface containing a front discharge opening, and an upper portion containing a rear loading aperture above the slide surface and rearwardly of the opening and provided with a front edge, the aperture being arranged in flow communication with the outlet for intake of solids material from the hopper, the upper portion including an upper wall and having an underside and extending forwardly from the aperture front edge and overlying the slide surface, a receptacle disposed in the housing for movement between a rearward loading position and a forward discharge position, and containing a forward measuring bin and a rearward upper slide platform, the bin having an upper open entrance at a level adjacent the aperture and upper wall, and a lower open exit at a level adjacent the slide surface, the bin being of selective volume for receiving and dispensing a predetermined measured quantity of solids material, the entrance of the bin being provided with a rear edge and the platform extending rearwardly from the rear edge, the entrance of the bin being further provided with an entrance front edge portion and a receptacle forward platform portion extending forwardly from said entrance front edge portion and located at a level below said aperture front edge portion, said receptacle forward platform portion and said underside of the upper wall of the housing forming a space therebetween, the entrance being in operative registry with the aperture when the receptacle is in rearward position for loading solids material into the bin from the hopper, and the exit being in operative registry with the opening when the receptacle is in forward position for discharging the solids material from the bin, guide means in the housing for slidably guiding the receptacle relative to the housing during movement of the receptacle between said positions, and resilient leveling means disposed in the space between the front edge portion and the forward platform portion with the underside of the upper wall adjacent the aperture front edge and arranged in immediate underlying relation to the aperture front edge and in immediate overlying relation to the entrance and platform for cooperation with the entrance and platform to prevent overlying solids material in the aperture from moving forwardly in the housing between the leveling means and platform and from being sheared or jammed between the aperture front edge and entrance rear edge, during receptacle forward movement with the solids material at the exit sliding on the slide surface, and with the platform sliding against overlying solids material in the aperture, for discharge of the bin loaded solids material from the exit through the opening when the receptacle reaches the forward position.

9. Dispenser of claim 8 wherein the leveling means include a plurality of side by side resilient finger-like elements disposed along the aperture front edge in downwardly extending facing relation to the slide surface.

10. Dispenser of claim 9 wherein the elements comprise a brush assembly.

11. Measured quantity dispenser for flowable solids material such as frangible granules, which comprises a housing having a lower slide surface containing a front discharge opening, and an upper portion containing a rear loading aperture above the slide surface and rearwardly of the opening and provided with a front edge, the aperture being adapted for intake of solids material from an overlying source, said upper portion of the housing having an upper wall with an underside extending forwardly from the aperture front edge and overlying the slide surface, a receptacle disposed in the housing for movement between a rearward loading position and a forward discharge position, and containing a forward measuring bin and a rearward upper slide platform, the bin having an upper open entrance at a level adjacent the aperture and a lower open exit at a level adjacent the slide surface, the bin being of selective volume for receiving and dispensing a predetermined measured quantity of solids material, the entrance of the bin being provided with a rear edge and the platform extending rearwardly from the rear edge, the entrance of the bin being further provided with an entrance front edge portion and a receptacle forward platform portion extending forwardly from said entrance front edge portion and located at a level below said aperture front edge portion, said receptacle forward platform portion and said underside of the upper wall of the housing forming a space therebetween, the entrance being in operative registry with the aperture when the receptacle is in rearward position for loading solids material into the bin from the source, and the exit being in operative registry with the opening when the receptacle is in forward position for discharging the solids material from the bin, and resilient leveling means disposed in the space formed by the receptacle forward platform portion and the entrance front edge portion with the underside of the upper wall of the housing adjacent the aperture front edge and arranged in immediate underlying relation to the aperture front edge and in immediate overlying relation to the entrance and platform for cooperation with the entrance and platform to prevent overlying solids material in the aperture from moving forwardly in the housing between the leveling means and platform and from being sheared or jammed between the aperture front edge and entrance rear edge, during receptacle forward movement with the solids material at the exit sliding on the slide surface, and with the platform sliding against overlying solids material in the aperture, for discharge of the bin loaded solids material from the exit through the opening when the receptacle reaches the forward position, the entrance being out of flow communication with the aperture when the exit is in flow communication with the opening and the exit being out of flow communication with the opening when the entrance is in flow communication with the aperture, such that during movement of the receptacle the housing aperture is out of flow communication with the housing opening through the bin entrance and exit in the receptacle.

12. Measured quantity dispenser for flowable solids material such as frangible granules, which comprises a gravity flow storage hopper having a lower feed outlet, a housing below the hopper and having a lower slide surface containing a front discharge opening, and an upper portion containing a rear loading aperture above the slide surface and rearwardly of the opening and provided with a front edge, the aperture being arranged in flow communication with the outlet for intake of solids material from the hopper, the upper portion including an upper wall and having an underside and extending forwardly from the aperture front edge and overlying the slide surface, a receptacle disposed in the housing for movement between a rearward loading position and a forward discharge position, and containing a forward measuring bin and a rearward upper slide platform, the bin having an upper open entrance at a level adjacent the aperture and upper wall, and a lower open exit at a level adjacent the slide surface, the bin being of selective volume for receiving and dispensing a predetermined measured quantity of solids material, the entrance of the bin being provided with a rear edge and the platform extending rearwardly from the rear edge, the entrance of the bin being further provided with an entrance front edge portion and a receptacle forward platform portion extending forwardly from said entrance front edge portion and located at a level below said aperture front edge portion, said receptacle forward platform portion and said underside of the upper wall of the housing forming a space therebetween, the entrance being in operative registry with the aperture when the receptacle is in rearward position for loading solids material into the bin from the hopper, and the exit being in operative registry with the opening when the receptacle is in forward position for discharging the solids material from the bin, guide means in the housing for slidably guiding the receptacle relative to the housing during movement of the receptacle between said positions, and resilient leveling means disposed in the space between the front edge portion and the forward platform portion with the underside of the upper wall adjacent the aperture front edge and arranged in immediate underlying relation to the aperture front edge and in immediate overlying relation to the entrance and platform for cooperation with the entrance and platform to prevent overlying solids material in the aperture from moving forwardly in the housing between the leveling means and platform and from being sheared or jammed between the aperture front edge and entrance rear edge, during receptacle forward movement with the solids material at the exit sliding on the slide surface, and with the platform sliding against overlying solids material in the aperture, for discharge of the bin loaded solids material from the exit through the opening when the receptacle reaches the forward position, the entrance being out of flow communication with the aperture when the exit is in flow communication with the opening and the exit being out of flow communication with the opening when the entrance is in flow communication with the aperture, such that during movement of the receptacle the housing aperture is out of flow communication with the housing opening through the bin entrance and exit in the receptacle.

* * * * *